(12) United States Patent
Teshima et al.

(10) Patent No.: US 8,899,946 B2
(45) Date of Patent: Dec. 2, 2014

(54) FAN HAVING A BALANCE CORRECTION PORTION

(75) Inventors: Hiroyoshi Teshima, Kyoto (JP); Kiyoto Ida, Kyoto (JP)

(73) Assignee: Nidec Corporation, Kyoto (JP)

( * ) Notice: Subject to any disclaimer, the term of this patent is extended or adjusted under 35 U.S.C. 154(b) by 50 days.

(21) Appl. No.: 13/438,325

(22) Filed: Apr. 3, 2012

(65) Prior Publication Data

US 2013/0004304 A1 Jan. 3, 2013

(30) Foreign Application Priority Data

Jun. 30, 2011 (JP) ................. 2011-146729

(51) Int. Cl.
| | | |
|---|---|---|
| F04D 29/26 | (2006.01) | |
| F04D 29/00 | (2006.01) | |
| H02K 7/04 | (2006.01) | |
| F04D 25/06 | (2006.01) | |
| F04D 29/66 | (2006.01) | |
| H02K 11/00 | (2006.01) | |

(52) U.S. Cl.
CPC .............. H02K 7/04 (2013.01); F04D 25/0613 (2013.01); F04D 29/662 (2013.01); H02K 11/0073 (2013.01)
USPC .................... 417/423.14; 417/354; 417/423.7

(58) Field of Classification Search
USPC .......... 417/354, 423.1, 423.7, 423.12, 423.14
See application file for complete search history.

(56) References Cited

U.S. PATENT DOCUMENTS

| | | |
|---|---|---|
| 2005/0025405 A1 | 2/2005 | Tamaoka |
| 2009/0035162 A1* | 2/2009 | Yan et al. ................... 417/423.7 |
| 2013/0004304 A1 | 1/2013 | Teshima et al. |

FOREIGN PATENT DOCUMENTS

| | | |
|---|---|---|
| CN | 1576623 A | 2/2005 |
| CN | 101900127 A | 12/2010 |
| CN | 102852830 A | 1/2013 |
| CN | 202926666 U | 5/2013 |
| JP | 6-284666 A | 10/1994 |
| JP | 2000-352397 A | 12/2000 |
| JP | 2005-045924 A | 2/2005 |
| JP | 2005-188325 A | 7/2005 |
| JP | 2006-038211 A | 2/2006 |
| JP | 2006-322325 A | 11/2006 |
| JP | 2013-015038 A | 1/2013 |

* cited by examiner

*Primary Examiner* — Peter J Bertheaud
(74) *Attorney, Agent, or Firm* — Westerman, Hattori, Daniels & Adrian, LLP

(57) ABSTRACT

A fan includes a motor including a rotating portion and a stationary portion; an impeller including a plurality of blades and a blade support portion to which the blades are fixed, and arranged to cover the motor; and a housing including a lower plate portion arranged on a lower side of the blades, a side wall portion arranged to cover sides of the blades, and an upper plate portion arranged on an upper side of the blades and including an air inlet arranged to extend through the upper plate portion in an axial direction. A lower surface of the blade support portion includes a balance correction portion arranged to extend in a circumferential direction. The lower plate portion includes a through hole arranged to overlap with the balance correction portion in the axial direction to make a portion of the balance correction portion viewable from below the lower plate portion.

20 Claims, 9 Drawing Sheets

FAN HAVING A BALANCE CORRECTION PORTION

BACKGROUND OF THE INVENTION

1. Field of the Invention

The present invention relates to a blower fan which allows unbalance of a rotating body to be corrected.

2. Description of the Related Art

In recent years, electronic devices have been becoming more and more densely packed with components, and electronic components installed in the electronic devices and blower fans arranged to cool the electronic components have accordingly tended to be disposed close to each other. Such a blower fan is arranged to produce air currents through rotation of an impeller, i.e., a rotating body. Therefore, unbalance of the impeller causes rotation unbalance during the rotation, and the rotation unbalance causes vibrations.

JP-A 06-284666, for example, discloses a method of correcting unbalance of a rotating body.

SUMMARY OF THE INVENTION

In a brushless motor as described in JP-A 06-284666 by way of example, a balancing weight is attached to a portion of an inside of a rotor yoke to achieve unbalance correction.

However, the unbalance correction as described in JP-A 06-284666 has to be carried out during a process of assembling the motor. Specifically, unbalance correction of a rotor is carried out before the rotor is attached to a stationary body. In this case, after the rotor is attached to the stationary body, the motor may be assembled in such a manner that a central axis of the rotor is displaced from a rotation center of the motor. If this happens, unbalance occurs in the rotating body, which will be a cause of vibrations.

In order to solve the above problem, it is necessary to carry out the unbalance correction of the rotor after the rotor is attached to the stationary body.

The present invention has been conceived primarily to carry out unbalance correction after the rotor is attached to the stationary body.

A blower fan according to a preferred embodiment of the present invention is a fan including a motor including a rotating portion and a stationary portion; an impeller including a plurality of blades and a blade support portion to which the blades are fixed, and arranged to cover the motor; and a housing including a lower plate portion arranged to cover a lower side of the blades, a side wall portion arranged to cover sides of the blades, and an upper plate portion arranged above an upper side of the blades and including an air inlet arranged to extend through the upper plate portion in an axial direction. A lower surface of the blade support portion includes a balance correction portion arranged to extend in a circumferential direction. The lower plate portion includes a through hole arranged to overlap with the balance correction portion in the axial direction to make a portion of the balance correction portion viewable from below the lower plate portion.

According to the present invention, it is possible to carry out unbalance correction of the rotating portion after the rotating portion is attached to the stationary portion.

DETAILED DESCRIPTION OF THE PREFERRED EMBODIMENTS

Figure 1:
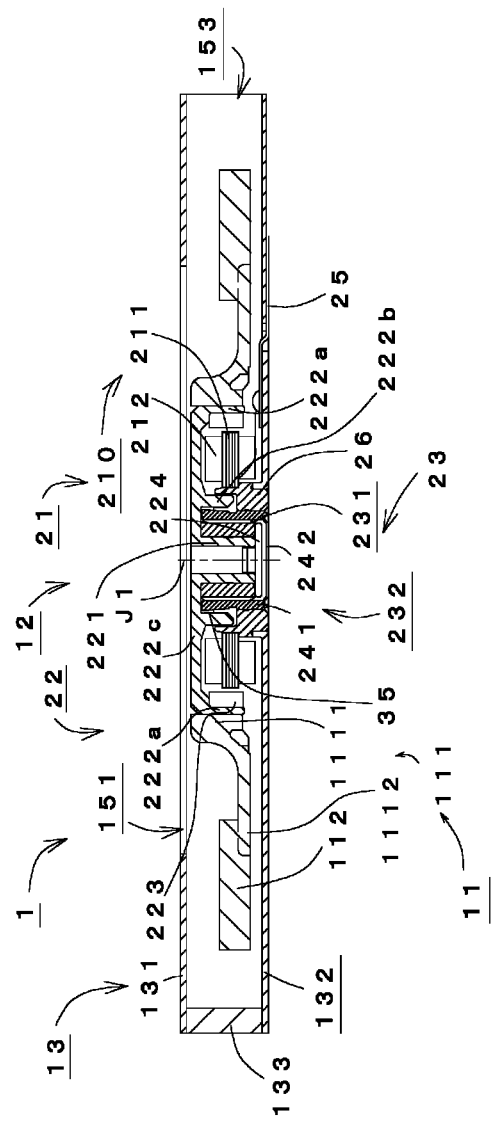
FIG. 1 is a cross-sectional view of a blower fan according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that directions perpendicular to the central axis are referred to by the term "radial direction", "radial", or "radially", and that a circumferential direction about the central axis is referred to by the term "circumferential direction", "circumferential", or "circumferentially".

FIG. 1 is a cross-sectional view of a blower fan 1 according to a first preferred embodiment of the present invention. The blower fan 1 is a centrifugal fan, and is, for example, used to cool electronic components inside a notebook personal computer. The blower fan 1 includes an impeller 11, a motor 12, and a housing 13. The impeller 11 is arranged to extend radially outward from a rotating portion 22 of the motor 12. The impeller 11 is arranged to rotate about a central axis J1 through the motor 12.

The impeller 11 is made of a resin, and includes a blade support portion 111 and a plurality of blades 112. The blade support portion 111 is fixed to the rotating portion 22. The blade support portion 111 includes a rotor fixing portion 1111, which is used for connection with the motor 12, and a blade fixing portion 1112, which is used for connection with the blades 112. The rotor fixing portion 1111 is arranged to extend in an axial direction to assume the shape of a cylinder. The blade fixing portion 1112 is arranged to extend radially outward from a lower region of an outer circumferential surface of the rotor fixing portion 1111 to substantially assume the shape of a disk. An inner circumferential surface of the rotor fixing portion 1111 is fixed to the rotating portion 22 of the motor 12. The blades 112 are arranged to extend radially outward from an upper surface of the blade support portion 111 with the central axis J1 as a center. The blade support portion 111 and the blades 112 are defined integrally with each other by a resin injection molding process.

The blower fan 1 is arranged to produce air currents through rotation of the impeller 11 about the central axis J1 caused by the motor 12.

The housing 13 is arranged to contain the motor 12 and the impeller 11. The housing 13 includes an upper plate portion 131, a mounting plate 132 (hereinafter referred to as a lower plate portion 132), and a side wall portion 133. The upper plate portion 131 is a substantially plate-shaped member made of a metal. The upper plate portion 131 is arranged on an upper side of the motor 12 and the impeller 11. The upper plate portion 131 includes one air inlet 151 extending therethrough in the axial direction. The air inlet 151 is arranged to overlap with the impeller 11 and the motor 12 in the axial direction. The air inlet 151 is arranged substantially in the shape of a circle, and is arranged to overlap with the central axis J1.

The lower plate portion 132 is a substantially plate-shaped member produced by subjecting a metal sheet to press working. The lower plate portion 132 is arranged on a lower side of the motor 12 and the impeller 11. The side wall portion 133 is made of a resin. The side wall portion 133 is arranged to cover sides of the impeller 11. An upper end portion of the side wall portion 133 is fixed to the upper plate portion 131 through screws or by another fixing method. A lower end portion of the side wall portion 133 is fixed to the lower plate portion 132 through insert molding. The side wall portion 133 is arranged substantially in the shape of the letter "U" when viewed in the axial direction, and includes an air outlet 153 which opens radially outward. In more detail, portions of the upper and lower plate portions 131 and 132 are arranged on an upper side and a lower side, respectively, of an opening of the side wall portion 133, and an area enclosed by the upper and lower plate portions 131 and 132 and the opening of the side wall portion 133 is the air outlet 153. Note that the side wall portion 133 may not necessarily be fixed to the lower plate portion 132 through insert molding. Also note that the side wall portion 133 may not necessarily be made of a resin. Also note that each of the upper and lower plate portions 131 and 132 may be fixed to the side wall portion 133 by a fixing method not mentioned above.

Figure 2:
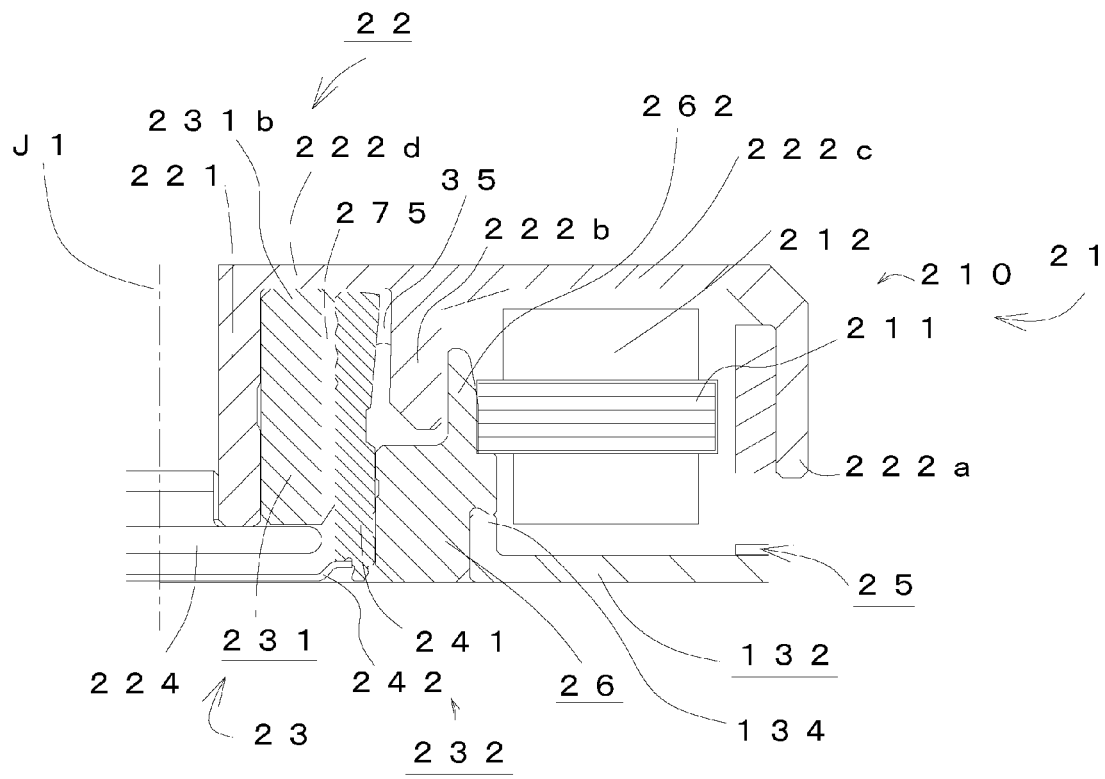
FIG. 2 is a cross-sectional view of a motor and its vicinity according to the first preferred embodiment.

FIG. 2 is a cross-sectional view of the motor 12 and its vicinity. The motor 12 is an outer-rotor motor. The motor 12 includes a stationary portion 21 and the rotating portion 22. The stationary portion 21 includes a bearing portion 23, a stator 210, a circuit board 25, and a bushing 26.

The bearing portion 23 is arranged radially inward of the stator 210. The bearing portion 23 includes a sleeve 231 and a bearing housing 232. The sleeve 231 is substantially cylindrical in shape and centered on the central axis J1. The sleeve 231 is a metallic sintered body. The sleeve 231 is impregnated with a lubricating oil. A plurality of circulation grooves 275, each of which is arranged to extend in the axial direction, are defined in an outer circumferential surface of the sleeve 231. The circulation grooves 275 are arranged at regular intervals in a circumferential direction. The bearing housing 232 includes a housing cylindrical portion 241 and a cap 242. The housing cylindrical portion 241 is substantially cylindrical in shape and centered on the central axis J1. The sleeve 231 is fixed to an inner circumferential surface of the housing cylindrical portion 241 through an adhesive. The bearing housing 232 is made of a metal. The cap 242 is fixed to a lower end portion of the housing cylindrical portion 241. That is, the cap 242 is arranged to close a lower end portion of the bearing housing 232. Note that use of the adhesive to fix the sleeve 231 to the inner circumferential surface of the housing cylindrical portion 241 is not essential to the present invention. For example, the sleeve 231 may be fixed to the inner circumferential surface of the housing cylindrical portion 241 through press fit.

The bushing 26 is a substantially annular member. The bushing 26 is produced by subjecting a metallic member to a cutting process. An inner circumferential surface of the bushing 26 is fixed to a lower region of an outer circumferential surface of the bearing portion 23. Meanwhile, an outer circumferential surface of the bushing 26 is fixed to a hole portion of the lower plate portion 132.

The stator 210 is a substantially annular member centered on the central axis J1. The stator 210 includes a stator core 211 and a plurality of coils 212 arranged on the stator core 211. The stator core 211 is defined by laminated silicon steel sheets, each of which is in the shape of a thin sheet. The stator core 211 includes a substantially annular core back and a plurality of teeth arranged to project radially outward from the core back. A conducting wire is wound around each of the teeth to define the coils 212. The circuit board 25 is arranged below the stator 210. Lead wires of the coils 212 are electrically connected to the circuit board 25. The circuit board 25 is a flexible printed circuit (FPC) board.

The rotating portion 22 includes a shaft 221, a thrust plate 224, a rotor holder 222, and a rotor magnet 223. The shaft 221 is arranged to have the central axis J1 as a center thereof.

The rotor holder 222 is substantially in the shape of a covered cylinder, and is centered on the central axis J1. The rotor holder 222 includes a tubular portion 222a and a cover portion 222c. The cover portion 222c is arranged to extend radially outward from an upper end portion of the shaft 221. A lower surface of the cover portion 222c is a substantially annular surface arranged around the shaft 221. The lower surface of the cover portion 222c is arranged axially opposite each of an upper surface 231b of the sleeve 231 and an upper surface of the bearing housing 232. Hereinafter, a portion of the cover portion 222c which is arranged axially opposite the upper surface 231b of the sleeve 231 and the upper surface of the bearing housing 232 will be referred to as a "first thrust portion 222d".

The thrust plate 224 includes a substantially disk-shaped portion arranged to extend radially outward. The thrust plate 224 is fixed to a lower end portion of the shaft 221. An upper surface of the thrust plate 224 is a substantially annular surface arranged around the shaft 221. The upper surface of the thrust plate 224 is arranged axially opposite a lower surface 231c of the sleeve 231. Hereinafter, the thrust plate 224 will be referred to as a "second thrust portion 224". Moreover, a lower surface of the second thrust portion 224 is arranged opposite to an upper surface of the cap 242 of the bearing housing 232. The shaft 221 is inserted in the sleeve 231. Note that the second thrust portion 224 may be defined integrally with the shaft 221.

The shaft 221 is defined integrally with the rotor holder 222. The shaft 221 and the rotor holder 222 are produced by subjecting a metallic member to a cutting process. That is, the cover portion 222c and the shaft 221 are continuous with each other. Note that the shaft 221 may be defined by a member separate from the rotor holder 222. In this case, the upper end portion of the shaft 221 is fixed to the cover portion 222c of the rotor holder 222. The rotor magnet 223 is fixed to an inner circumferential surface of the tubular portion 222a, which is arranged to extend downward from a radially outer end portion of the cover portion 222c of the rotor holder 222.

The rotor holder 222 further includes an annular tubular portion 222b, which is substantially annular in shape and arranged to extend downward from the lower surface of the cover portion 222c. The first thrust portion 222d is arranged radially inward of the annular tubular portion 222b. The annular tubular portion 222b is arranged radially inward of the stator 210. An inner circumferential surface of the annular tubular portion 222b is arranged radially opposite an outer circumferential surface of an upper portion of the bearing housing 232. A seal gap 35 is defined between the bearing housing 232 and the inner circumferential surface of the annular tubular portion 222b. The lubricating oil is arranged in the seal gap 35.

The inner circumferential surface of the rotor fixing portion 1111 is fixed to an outer circumferential surface of the tubular portion 222a of the rotor holder 222. That is, the upper end portion of the shaft 221 is fixed to the impeller 11 through the rotor holder 222. Note that the impeller 11 may be defined integrally with the rotor holder 222. In this case, the upper end portion of the shaft 221 is fixed to the impeller 11 in a direct manner.

The rotor magnet 223 is substantially cylindrical in shape and centered on the central axis J1. The rotor magnet 223 is fixed to the inner circumferential surface of the tubular portion 222a. The rotor magnet 223 is arranged radially outward of the stator 210.

Figure 3:
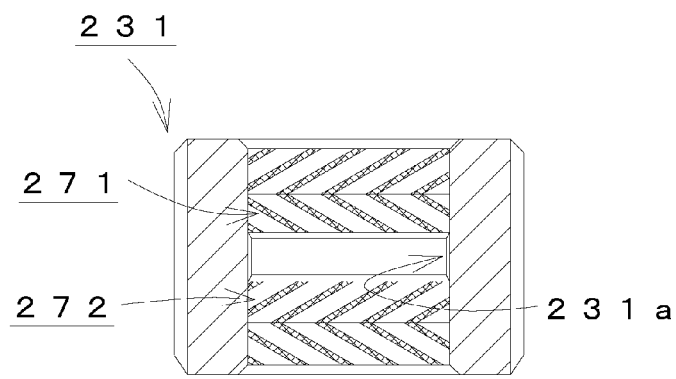
FIG. 3 is a cross-sectional view of a sleeve according to the first preferred embodiment.
Figure 4:
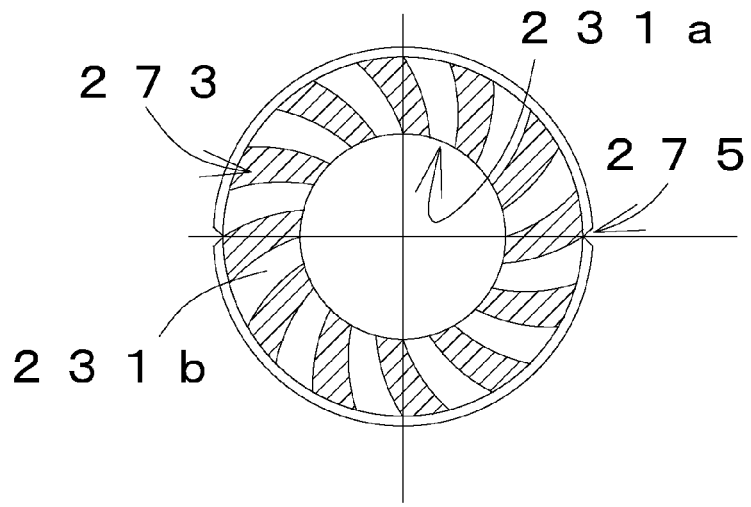
FIG. 4 is a top view of the sleeve.
Figure 5:
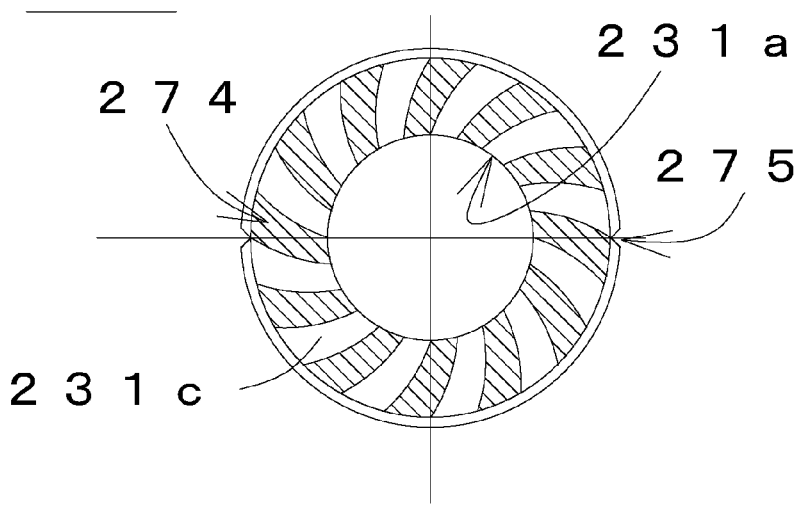
FIG. 5 is a bottom view of the sleeve.

FIG. 3 is a cross-sectional view of the sleeve 231. A first radial dynamic pressure groove array 271 and a second radial dynamic pressure groove array 272 are defined in an upper portion and a lower portion, respectively, of an inner circumferential surface 231a of the sleeve 231. Each of the first and second radial dynamic pressure groove arrays 271 and 272 is made up of a plurality of grooves arranged in a herringbone pattern. FIG. 4 is a top view of the sleeve 231. A first thrust dynamic pressure groove array 273 is defined in the upper surface 231b of the sleeve 231. The first thrust dynamic pressure groove array 273 is made up of a plurality of grooves arranged in a spiral pattern. FIG. 5 is a bottom view of the sleeve 231. A second thrust dynamic pressure groove array 274 is defined in the lower surface 231c of the sleeve 231. The second thrust dynamic pressure groove array 274 is made up of a plurality of grooves arranged in the spiral pattern.

Figure 6:
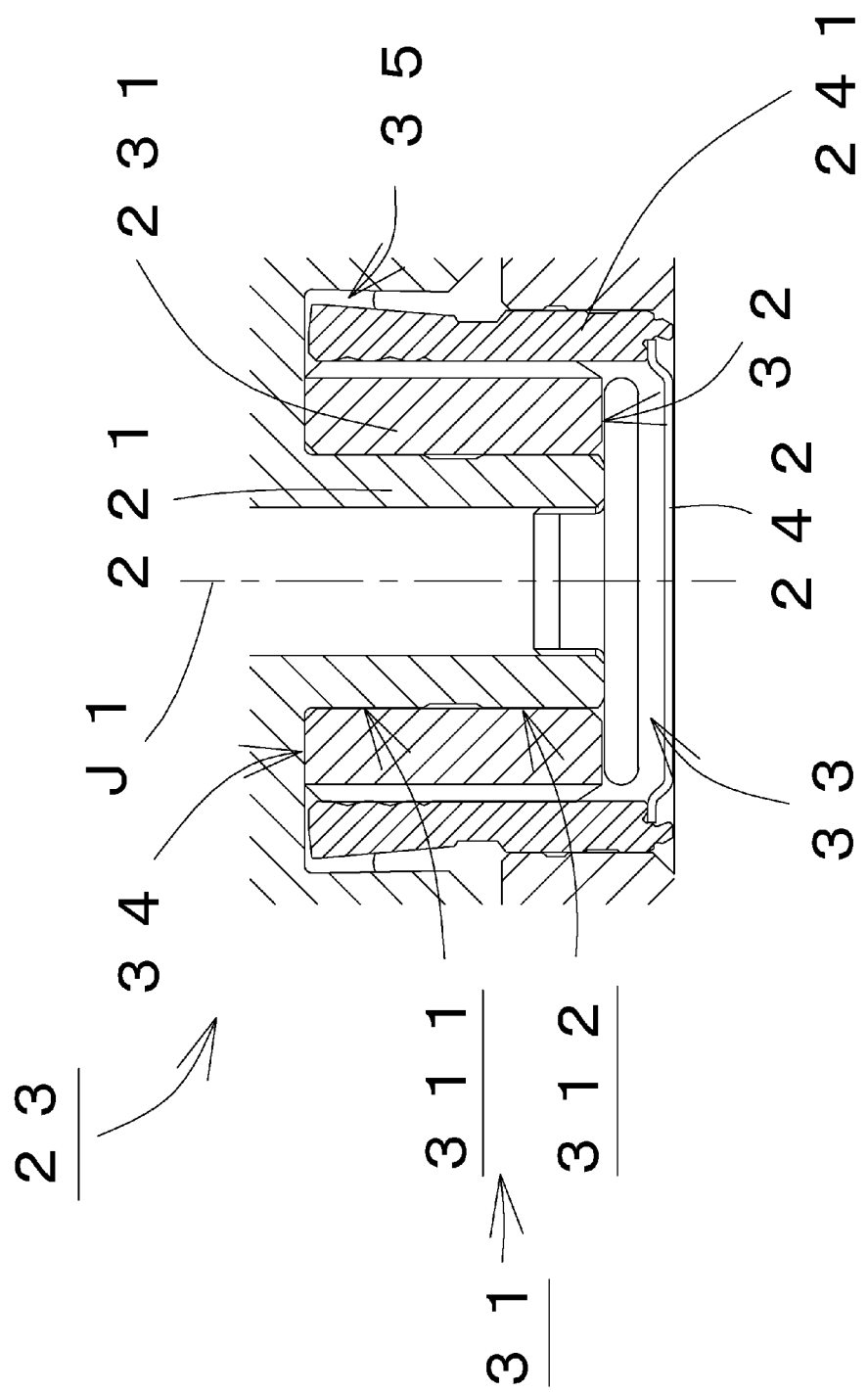
FIG. 6 is a cross-sectional view of a bearing portion and its vicinity according to the first preferred embodiment.

FIG. 6 is a cross-sectional view of the bearing portion 23 and its vicinity. A radial gap is defined between an outer circumferential surface of the shaft 221 and the inner circumferential surface 231a of the sleeve 231. The radial gap includes a first radial gap 311 and a second radial gap 312, which is arranged on a lower side of the first radial gap. The first radial gap 311 is defined between the outer circumferential surface of the shaft 221 and a portion of the inner circumferential surface 231a of the sleeve 231 in which the first radial dynamic pressure groove array 271 is defined. The lubricating oil is arranged in the first radial gap 311. The second radial gap 312 is defined between the outer circumferential surface of the shaft 221 and a portion of the inner circumferential surface 231a of the sleeve 231 in which the second radial dynamic pressure groove array 272 is defined. The lubricating oil is arranged in the second radial gap 312. The first and second radial gaps 311 and 312 are arranged to together define a radial dynamic pressure bearing portion 31 arranged to produce a fluid dynamic pressure in the lubricating oil.

A first thrust gap 34 is defined between a portion of the upper surface 231b of the sleeve 231 in which the first thrust dynamic pressure groove array 273 is defined and a lower surface of the first thrust portion 222d of the rotor holder 222. The lubricating oil is arranged in the first thrust gap 34. The first thrust gap 34 is arranged to define a thrust dynamic pressure bearing portion arranged to produce a fluid dynamic pressure in the lubricating oil. The first thrust gap 34 will be hereinafter referred to as an "upper thrust dynamic pressure bearing portion 34".

A second thrust gap 32 is defined between a portion of the lower surface 231c of the sleeve 231 in which the second thrust dynamic pressure groove array 274 is defined and an upper surface of the second thrust portion 224. The lubricating oil is arranged in the second thrust gap 32. The second thrust gap 32 is arranged to define a thrust dynamic pressure bearing portion arranged to produce a fluid dynamic pressure in the lubricating oil. The second thrust gap 32 will be hereinafter referred to as a "lower thrust dynamic pressure bearing portion 32". The upper and lower thrust dynamic pressure bearing portions 34 and 32 are arranged to be in communication with each other through the circulation grooves 275. The circulation grooves 275 serve to adjust a difference in pressure between the upper and lower thrust dynamic pressure bearing portions 34 and 32.

A third thrust gap 33 is defined between the upper surface of the cap 242 of the bearing housing 232 and the lower surface of the second thrust portion 224.

In the motor 12, the seal gap 35, the upper thrust dynamic pressure bearing portion 34, the radial dynamic pressure bearing portion 31, the lower thrust dynamic pressure bearing portion 32, the circulation grooves 275, and the third thrust gap 33 are arranged to together define a single continuous space, and the lubricating oil is continuously arranged in this space. Within this space, a surface of the lubricating oil is defined only in the seal gap 35 as illustrated in FIG. 6. The rotating portion 22 is supported through the bearing portion 23 to be rotatable about the central axis J1 with respect to the stationary portion 21.

In the motor 12, once power is supplied to the stator 210, a torque centered on the central axis J1 is produced between the rotor magnet 223 and the stator 210, so that the rotating portion 22 and the impeller 11 are caused to rotate about the central axis J1. The rotation of the impeller 11 causes an air to be drawn into the housing 13 through the air inlet 151 and then sent out through the air outlet 153.

Figure 7:
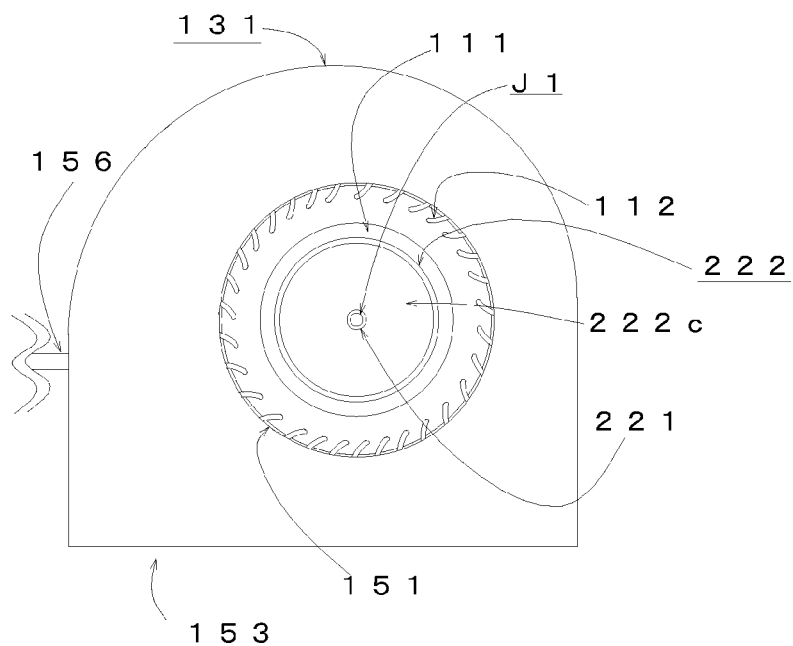
FIG. 7 is a top view of the blower fan.

FIG. 7 is a plan view of the blower fan 1 as viewed from above. The air inlet 151 is in the shape of a circle and centered on the central axis J1. Note that the shape of the air inlet 151 is not limited to the circle, and may be varied in accordance with a required characteristic of the blower fan 1. Also note that a center of the air inlet 151 may be displaced from the central axis J1.

An inner edge of each of the blades 112 is exposed in the air inlet 151 when viewed in the axial direction. Thus, during the rotation of the impeller 11, the air taken in through the air inlet 151 is efficiently sent toward the air outlet 153. Moreover, the rotor fixing portion 1111 is also exposed in the air inlet 151 when viewed in the axial direction. As the radial distance between an inner circumference of the air inlet 151 and the outer circumferential surface of the rotor fixing portion 1111 becomes greater, the amount of air taken in during the rotation of the impeller 11 becomes greater, and static pressure becomes lower. As the radial distance between the inner circumference of the air inlet 151 and the outer circumferential surface of the rotor fixing portion 1111 becomes smaller, the amount of air taken in becomes smaller, and the static pressure becomes higher. That is, the amount of air taken in and the static pressure stand in a trade-off relationship.

Figure 8:
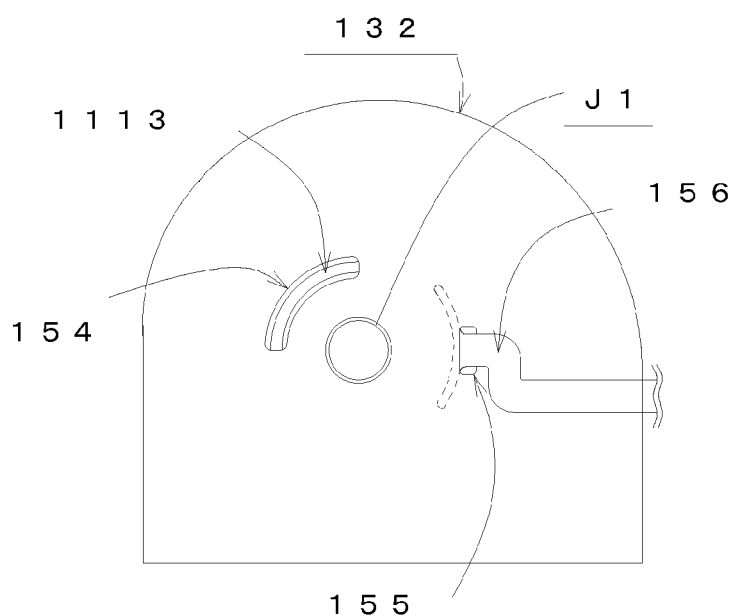
FIG. 8 is a bottom view of the blower fan.

FIG. 8 is a bottom view of the blower fan 1 as viewed from below. The lower plate portion 132 includes a first through hole 154 and a second through hole 155 defined therein. The first through hole 154 is arranged substantially in the shape of a circular arc centered on the central axis J1. The first through hole 154 is arranged to overlap with a balance correction portion 1113 in the axial direction. The balance correction portion 1113 will be described below.

Figure 9:
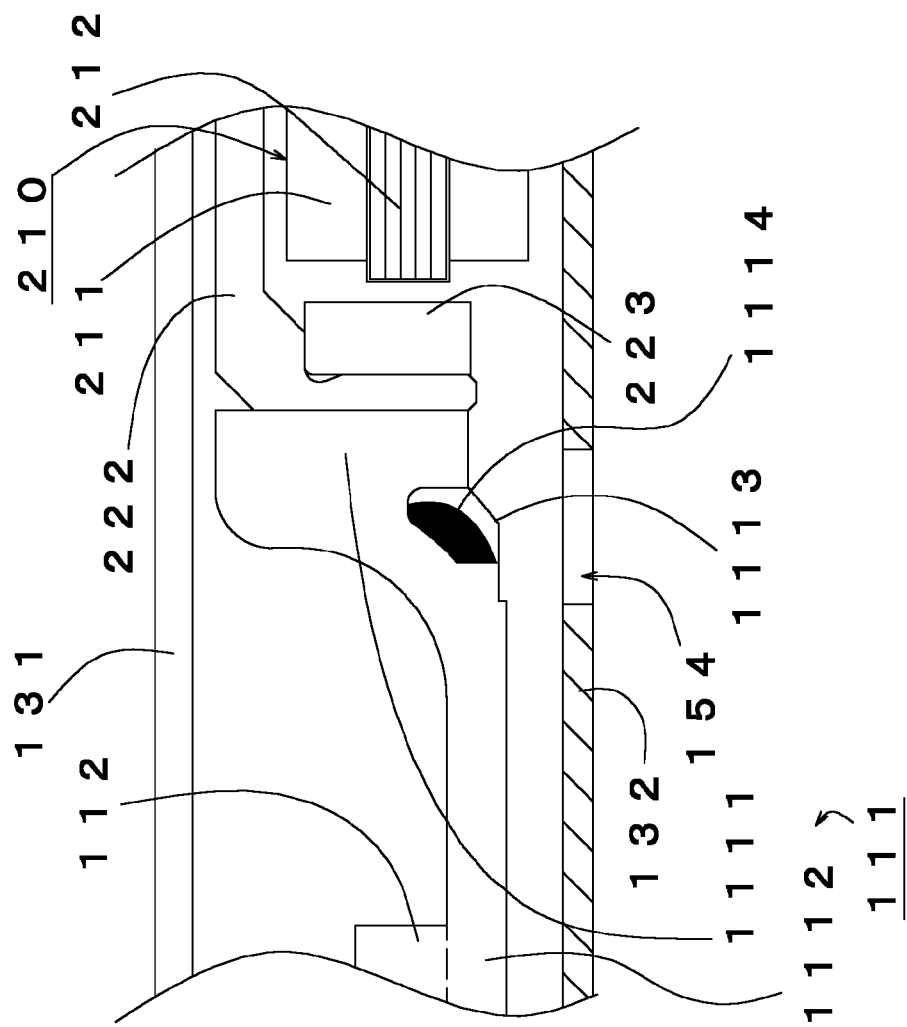
FIG. 9 is a diagram illustrating a portion of an impeller according to the first preferred embodiment in an enlarged form.

FIG. 9 is a cross-sectional view illustrating the balance correction portion 1113 according to the first preferred embodiment of the present invention. The balance correction portion 1113, which is defined by an annular recessed portion arranged to be recessed upward, is defined between the rotor fixing portion 1111 and the blade fixing portion 1112. Moreover, as described above, the first through hole 154 and the balance correction portion 1113 are arranged at substantially the same position both radially and circumferentially. An entire radial extension of the balance correction portion 1113, from a radially inner edge to a radially outer edge thereof, is exposed in the first through hole 154.

When the center of gravity of each of the impeller 11 and the rotating portion 22 does not coincide with the central axis J1 in the radial direction, the center of gravity rotates about the central axis J1 during rotation of the motor 2, causing vibrations. Therefore, it is desirable that unbalance correction should be carried out after the impeller 11 is attached to the rotating portion 22 so that the center of gravity of each of the impeller 11 and the rotating portion 22 coincides with the central axis J1 in the radial direction as exactly as possible.

The balance correction is carried out by attaching a balancing member 1114 to the balance correction portion 1113. The balancing member 1114 is an adhesive containing a metal having a large specific gravity, such as tungsten. In order to accomplish the balance correction efficiently, attachment of only a small amount of the balancing member 1114 should be enough to accomplish the balance correction. Therefore, it is desirable that the position to which the balancing member 1114 is attached should be as radially outward as possible on the impeller 11.

In the case where the balance correction portion 1113 is arranged as described above, it is possible to insert a jig through the first through hole 154 to perform application of the balancing member 1114 after the blower fan 1 has been assembled. In a process of assembling a rotating body of the blower fan 1, axes of components may be displaced from each other, for example. If a unbalance correction were carried out with respect to each component of the blower fan during a process of assembling the blower fan, the number of steps in the assembling process would increase. According to the present preferred embodiment, a unbalance correction is carried out after the blower fan 1 has been assembled, and therefore, a decrease in the number of steps in the assembling process is achieved, and the blower fan 1 can be provided with minimum displacement between the axes of components thereof, i.e., with a high accuracy in rotation balance.

According to the present preferred embodiment, a thrust dynamic pressure bearing, which exhibits a high accuracy, is adopted as the bearing, and therefore, only a small amount of axial movement is permitted. Therefore, it is possible to arrange the impeller 11 to be as close to each of the upper and lower plate portions 131 and 132 as possible. That is, it is possible to arrange the balance correction portion 1113 to be close to the lower plate portion 132.

After the unbalance correction is completed, a seal member is adhered to a bottom surface of the lower plate portion 132 from below to close the first through hole 154. Thus, a leakage of the air therethrough is prevented, and the static pressure is maintained at a sufficient level.

The circuit board 25 is arranged, on an upper side of the lower plate portion 132, in a different radial direction centered on the central axis J1 from that in which the first through hole 154 is arranged. The circuit board 25 is then drawn downwardly through the second through hole 155 and drawn radially outward on a lower side of the lower plate portion 132. A portion of the circuit board 25 is arranged to extend along a circumferential direction of the stator 211 so that the lead wires of the coils 212 wound on the teeth can be easily soldered to the circuit board 25. Thus, it is possible to attach the balancing member 1114 to the balance correction portion 1113 through the first through hole 154 without being obstructed by the circuit board 25.

Figure 10:
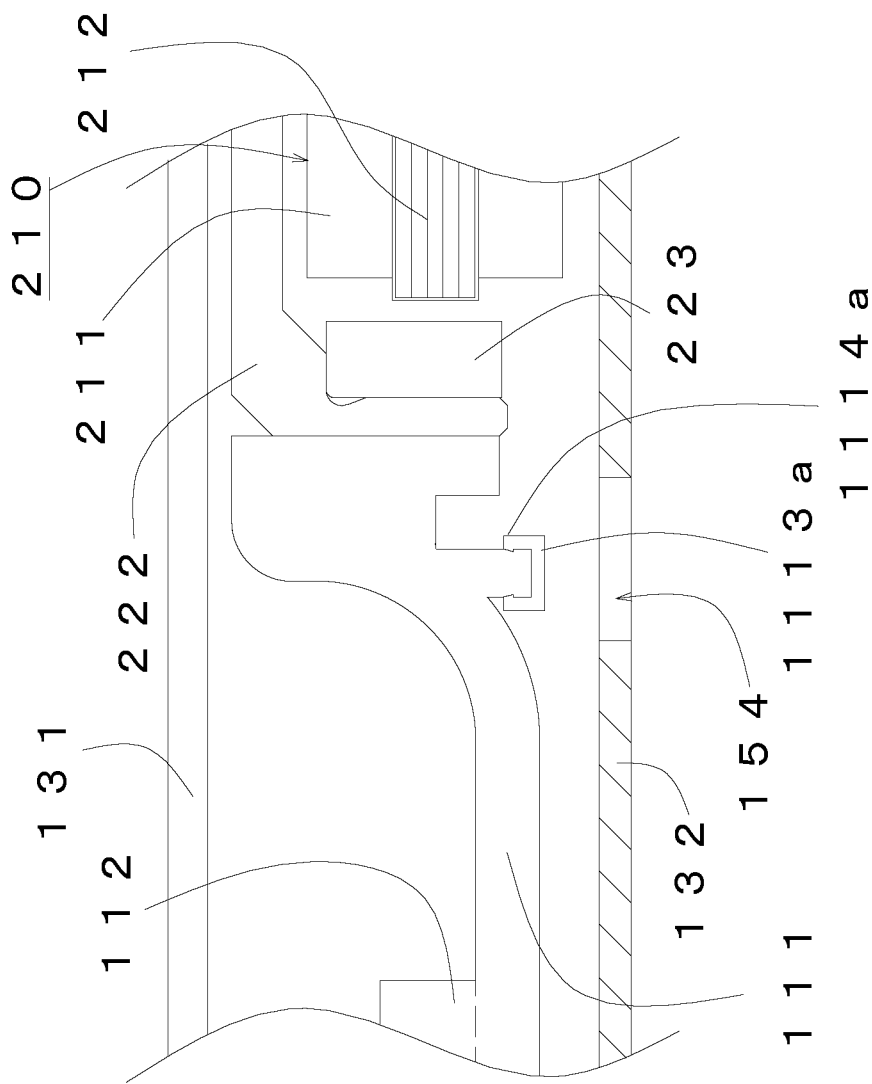
FIG. 10 is a diagram illustrating a portion of an impeller according to a modification of the first preferred embodiment in an enlarged form.

FIG. 10 is a cross-sectional view of a balance correction portion 1113a and a surrounding area according to a modification of the first preferred embodiment. The balance correction portion 1113a according to the present modification is defined by an annular raised portion arranged to project downward. A clip-type balancing member 1114a is arranged to hold a radially outer surface and a radially inner surface of the raised portion from both sides. The balancing member 1114a according to the present modification is fixed to the balance correction portion 1113a in a simplified manner, so that a decrease in the number of steps in the assembling process is achieved.

Figure 11:
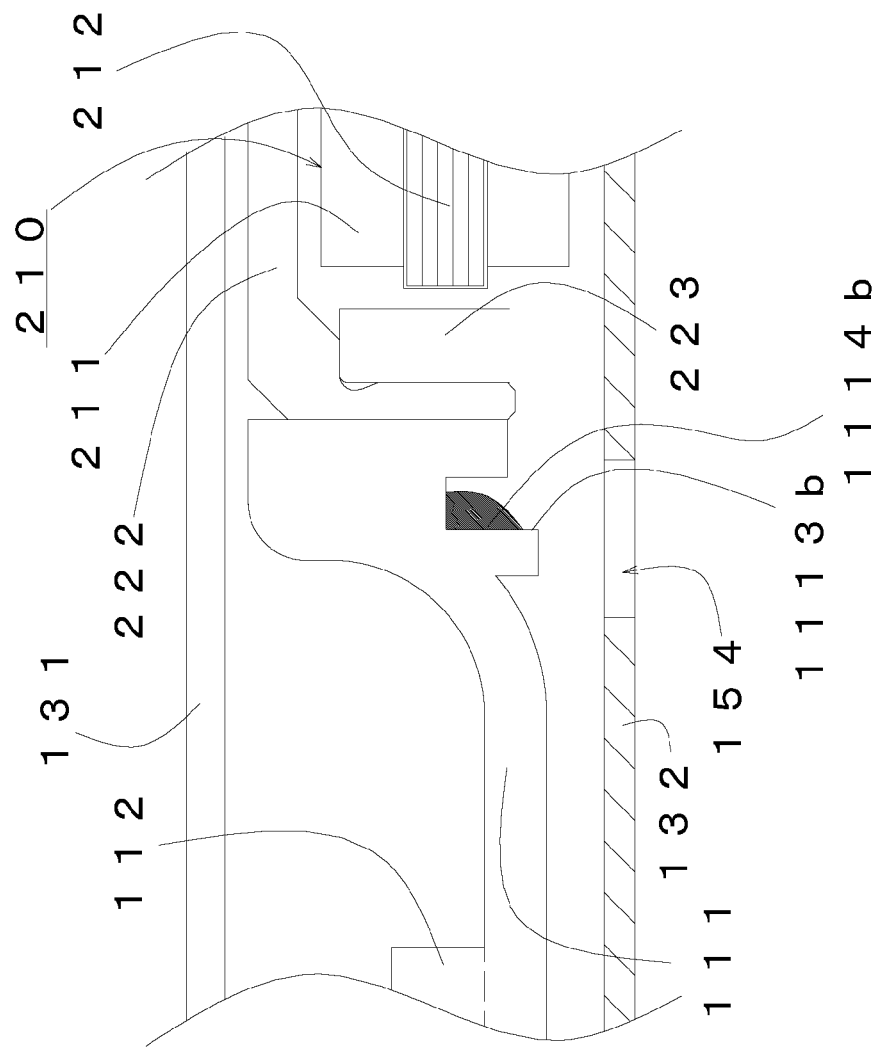
FIG. 11 is a diagram illustrating a portion of an impeller according to another modification of the first preferred embodiment in an enlarged form.

FIG. 11 is a cross-sectional view of a balance correction portion 1113b and a surrounding area according to a modification of the first preferred embodiment. The balance correction portion 1113b according to the present modification includes an annular recessed portion arranged to be recessed upward, and an annular raised portion arranged radially outward of the recessed portion and arranged to project downward. In other words, the annular raised portion arranged to project downward is additionally provided as compared to the balance correction portion 1113 according to the first preferred embodiment as illustrated in FIG. 9. Addition of the annular raised portion according to the present modification contributes to preventing a balancing member 1114b applied to the balance correction portion 1113b from undergoing a radially outward overflow. Note that only the raised portion may be provided without the recessed portion being arranged radially inward of the raised portion.

Figure 12:
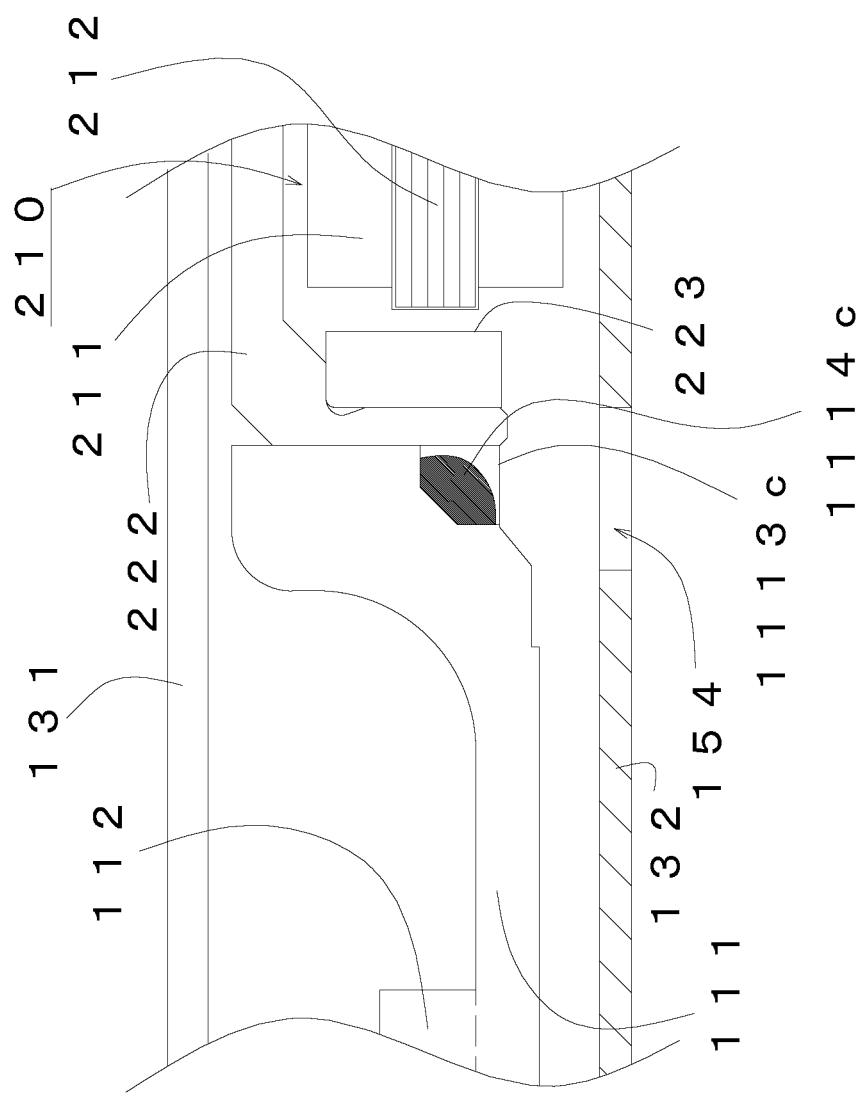
FIG. 12 is a diagram illustrating a portion of an impeller according to yet another modification of the first preferred embodiment in an enlarged form.

FIG. 12 is a cross-sectional view of a balance correction portion 1113c and a surrounding area according to a modification of the first preferred embodiment. The balance correction portion 1113c according to the present modification is arranged radially between the rotor holder 222 and the blade support portion 111. In other words, an outer circumferential surface of the rotor holder 222 is arranged to serve as a portion of the balance correction portion 1113c. The balance correction portion 1113c can thus be defined by a simplified process.

According to the present invention, it is possible to carry out the unbalance correction when the blower fan is in an assembled state, and an effect of reduced vibrations can accordingly be achieved. Note that a preferred embodiment of the present invention is also applicable to a blower fan in which a plain bearing having a simplified structure as compared to a thrust fluid dynamic bearing is adopted. Features of the above-described preferred embodiments and the modifications thereof may be combined appropriately as long as no conflict arises.

The present invention is applicable to fan motors arranged to allow unbalance of a rotating body to be corrected.

What is claimed is:
1. A fan comprising:
 a motor including a rotating portion having a magnet, and a stationary portion;
 an impeller including a plurality of blades and a blade support portion to which the blades are fixed, and arranged to cover the motor; and a housing including a lower plate portion arranged to cover a lower side of the blades, a side wall portion arranged to cover sides of the blades and including an air outlet which opens radially outward, and an upper plate portion arranged above an upper side of the blades and including an air inlet arranged to extend through the upper plate portion in an axial direction such that an air is drawn inside the housing from the air inlet and sent out through the air outlet when the impeller is rotated; wherein a lower surface of the blade support portion includes a balance correction portion radially between the magnet and the blades;

a balancing member attached to the balance correction portion; and the lower plate portion includes a through hole arranged to overlap with the balance correction portion in the axial direction to make a portion of the balance correction portion viewable from below the lower plate portion.

2. The fan according to claim 1, wherein the balance correction portion is defined by an annular recessed portion arranged to be recessed upward.

3. The fan according to claim 1, wherein the balance correction portion is defined by an annular raised portion arranged to project downward.

4. The fan according to claim 1, wherein
the rotating portion includes a rotor holder; and
the balance correction portion is arranged radially between the rotor holder and the blade support portion.

5. The fan according to claim 1, wherein
the rotating portion includes a rotor holder;
the blade support portion includes a rotor fixing portion arranged to extend in the axial direction and fixed to an outer circumferential surface of the rotor holder, and a blade fixing portion arranged to extend radially outward from a lower end of the rotor fixing portion; and
the balance correction portion is arranged between the rotor fixing portion and the blade fixing portion.

6. The fan according to claim 1, wherein the through hole is arranged in a shape of a circular arc.

7. The fan according to claim 1, wherein
the stationary portion includes a stator and a circuit board arranged below the stator.

8. The fan according to claim 1, further comprising:
a shaft arranged to rotate about a central axis;
a thrust plate fixed to a lower end portion of the shaft;
a rotor holder including a tubular portion, an annular tubular portion, and a cover portion, and fixed to an upper end portion of the shaft; and
a bearing portion arranged opposite to a lower surface of the rotor holder, and including a sleeve and a bearing housing including a cap; wherein
an inner circumferential surface of the annular tubular portion and the bearing housing are arranged to together define a seal gap therebetween;
an upper surface of the sleeve and a lower surface of the cover portion are arranged to together define a first thrust gap therebetween;
a lower surface of the sleeve and an upper surface of the thrust plate are arranged to together define a second thrust gap therebetween;
the sleeve and the shaft are arranged to together define a radial dynamic pressure bearing portion therebetween, the radial dynamic pressure bearing portion being arranged to produce a fluid dynamic pressure in a lubricating oil;

an outer circumferential surface of the sleeve includes a circulation groove arranged to extend in the axial direction;

an upper surface of the cap and a lower surface of the thrust plate are arranged to together define a third thrust gap therebetween; and the seal gap, the first thrust gap, the radial dynamic pressure bearing portion, the second thrust gap, the circulation groove, and the third thrust gap are arranged to together define a single continuous space, the lubricating oil is continuously arranged in this space, and a surface of the lubricating oil is defined only in the seal gap.

9. The fan according to claim 8, wherein the cap is arranged to close a lower end portion of the bearing housing.

10. The fan according to claim 1, further comprising a seal member adhered to a bottom surface of the lower plate portion to close the through hole.

11. The fan according to claim 1, wherein the balancing member is an adhesive containing a metal.

12. The fan according to claim 1, wherein the side wall portion is arranged substantially in a shape of a letter "U" when viewed in the axial direction.

13. A fan comprising:
a motor including a rotating portion and a stationary portion, the rotating portion including a rotor holder;
an impeller including a plurality of blades and a blade support portion to which the blades are fixed, and arranged to cover the motor, the blade support portion including:
a rotor fixing portion arranged to extend in the axial direction and fixed to an outer circumferential surface of the rotor holder, and
a blade fixing portion arranged to extend radially outward from a lower end of the rotor fixing portion; and
a housing including a lower plate portion arranged on a lower side of the blades, a side wall portion arranged to cover sides of the blades, and an upper plate portion arranged on an upper side of the blades and including an air inlet arranged to extend through the upper plate portion in an axial direction; wherein
a lower surface of the blade support portion includes a balance correction portion arranged to extend in a circumferential direction, the balance correction portion arranged between the rotor fixing portion and the blade fixing portion; and
the lower plate portion includes a through hole arranged to overlap with the balance correction portion in the axial direction to make a portion of the balance correction portion viewable from below the lower plate portion.

14. The fan according to claim 13, wherein the balance correction portion is defined by an annular recessed portion arranged to be recessed upward.

15. The fan according to claim 13, wherein the balance correction portion is defined by an annular raised portion arranged to project downward.

16. The fan according to claim 13, wherein
the rotating portion includes a rotor holder; and
the balance correction portion is arranged radially between the rotor holder and the blade support portion.

17. A fan comprising:
a motor including a rotating portion and a stationary portion;
an impeller including a plurality of blades and a blade support portion to which the blades are fixed, and arranged to cover the motor; and
a housing including a lower plate portion arranged on a lower side of the blades, a side wall portion arranged to cover sides of the blades, and an upper plate portion arranged on an upper side of the blades and including an air inlet arranged to extend through the upper plate portion in an axial direction; wherein a lower surface of the blade support portion includes a balance correction portion arranged to extend in a circumferential direction;

the lower plate portion includes a through hole arranged to overlap with the balance correction portion in the axial direction to make a portion of the balance correction portion viewable from below the lower plate portion, wherein the motor further comprises:
 a shaft arranged to rotate about a central axis;
 a thrust plate fixed to a lower end portion of the shaft;
 a rotor holder including a tubular portion, an annular tubular portion, and a cover portion, and fixed to an upper end portion of the shaft; and
 a bearing portion arranged opposite to a lower surface of the rotor holder, and including a sleeve and a bearing housing including a cap;

wherein an inner circumferential surface of the annular tubular portion and the bearing housing are arranged to together define a seal gap therebetween;

wherein an upper surface of the sleeve and a lower surface of the cover portion are arranged to together define a first thrust gap therebetween;

wherein a lower surface of the sleeve and an upper surface of the thrust plate are arranged to together define a second thrust gap therebetween;

wherein the sleeve and the shaft are arranged to together define a radial dynamic pressure bearing portion therebetween, the radial dynamic pressure bearing portion being arranged to produce a fluid dynamic pressure in a lubricating oil;

wherein an outer circumferential surface of the sleeve includes a circulation groove arranged to extend in the axial direction;

wherein an upper surface of the cap and a lower surface of the thrust plate are arranged to together define a third thrust gap therebetween; and wherein the seal gap, the first thrust gap, the radial dynamic pressure bearing portion, the second thrust gap, the circulation groove, and the third thrust gap are arranged to together define a single continuous space, the lubricating oil is continuously arranged in this space, and a surface of the lubricating oil is defined only in the seal gap.

18. The fan according to claim 17, wherein the balance correction portion is defined by an annular recessed portion arranged to be recessed upward.

19. The fan according to claim 17, wherein the balance correction portion is defined by an annular raised portion arranged to project downward.

20. The fan according to claim 17, wherein
 the rotating portion includes a rotor holder; and
 the balance correction portion is arranged radially between the rotor holder and the blade support portion.

* * * * *